United States Patent
Lum et al.

(10) Patent No.: US 11,170,105 B2
(45) Date of Patent: Nov. 9, 2021

(54) VERIFYING UPDATES BASED ON UPDATE BEHAVIOR-BASED PROFILES

(71) Applicant: International Business Machines Corporation, Armonk, NY (US)

(72) Inventors: Jia Jun Brandon Lum, White Plains, NY (US); Alaa S. Youssef, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 16/289,122

(22) Filed: Feb. 28, 2019

(65) Prior Publication Data

US 2020/0279044 A1    Sep. 3, 2020

(51) Int. Cl.

| | |
|---|---|
| *G06F 21/56* | (2013.01) |
| *G06F 21/57* | (2013.01) |
| *G06F 21/51* | (2013.01) |
| *G06F 21/64* | (2013.01) |
| *G06F 21/55* | (2013.01) |
| *G06F 21/44* | (2013.01) |
| *H04L 9/32* | (2006.01) |
| *H04L 9/08* | (2006.01) |
| *H04L 9/06* | (2006.01) |
| *G06F 21/53* | (2013.01) |

(52) U.S. Cl.
CPC ............ *G06F 21/566* (2013.01); *G06F 21/44* (2013.01); *G06F 21/51* (2013.01); *G06F 21/53* (2013.01); *G06F 21/552* (2013.01); *G06F 21/554* (2013.01); *G06F 21/572* (2013.01); *G06F 21/64* (2013.01); *H04L 9/0643* (2013.01); *H04L 9/0825* (2013.01); *H04L 9/3236* (2013.01); *H04L 9/3247* (2013.01)

(58) Field of Classification Search
None
See application file for complete search history.

(56) References Cited

U.S. PATENT DOCUMENTS

| | | | |
|---|---|---|---|
| 7,694,150 B1 | 4/2010 | Kirby | |
| 8,701,192 B1 | 4/2014 | Glick et al. | |
| 2005/0086500 A1* | 4/2005 | Albornoz | G06F 21/554 |
| | | | 713/188 |
| 2007/0174899 A1* | 7/2007 | Broberg | G06F 21/6218 |
| | | | 726/4 |
| 2010/0274755 A1* | 10/2010 | Stewart | G06F 8/75 |
| | | | 706/54 |
| 2010/0275026 A1 | 10/2010 | McLean | |
| 2011/0307712 A1 | 12/2011 | Sakthikumar et al. | |

(Continued)

OTHER PUBLICATIONS

Bellissimo et al., "Secure Software Updates: Disappointments and New Challenges," HotSec '06, 1st USENIX Workshop on Hot Topics in Security, Jul. 2006, pp. 37-43. https://www.usenix.org/legacy/events/hotsec06/tech/full_papers/bellissimo/bellissimo.pdf.

(Continued)

*Primary Examiner* — Benjamin E Lanier
(74) *Attorney, Agent, or Firm* — Yee & Associates, P.C.

(57) ABSTRACT

Verifying authenticity of software updates is provided. An update executable and an update behavior profile corresponding to a software update are hashed using a cryptographic hash function. A hash of the update executable and the update behavior profile is signed using a private key to form a hashed update digital signature.

20 Claims, 7 Drawing Sheets

(56) References Cited

U.S. PATENT DOCUMENTS

2013/0047149 A1* 2/2013 Xu .................... G06F 21/53
717/175
2015/0135262 A1* 5/2015 Porat ................. G06F 21/554
726/1
2018/0121651 A1 5/2018 Kim et al.

OTHER PUBLICATIONS

Alam et al., "Model-Based Behavioral Attestation," SACMAT 2008, 13th ACM Symposium on Access Control Models and Technologies, Estes Park, Colorado, Jun. 11-13, 2008, pp. 175-184.

* cited by examiner

VERIFYING UPDATES BASED ON UPDATE BEHAVIOR-BASED PROFILES

BACKGROUND

1. Field

The disclosure relates generally to software updates and more specifically to verifying authenticity of software updates based on behavior-based profiles corresponding to the software updates.

2. Description of the Related Art

Software is a collection of data and instructions that tell a computer or other type of data processing device how to work. Software may include operating systems, applications, programs, libraries, related non-executable data, such as online documentation or digital media, and the like. At the lowest programming level, executable code of software consists of machine language instructions supported by a processor, such as, for example, a central processing unit. A machine language consists of groups of binary values signifying processor instructions that change the state of the computer from its preceding state.

A software update is a download for an application, program, operating system, or software suite that provides fixes for features that aren't working as intended, resolves detected vulnerabilities, or adds minor software enhancements and compatibility. Typically, software updates are released as issues arise, such as minor bugs. In addition to computers, other types of data processing devices that need software updates include, for example, tablets, smart phones, smart watches, gaming systems, and the like. In most cases, unless a user has chosen a setting that allows automatic updates, the device notifies the user when a software update is available and provides the user with some information on why the update is important.

SUMMARY

According to one illustrative embodiment, a computer-implemented method for verifying authenticity of software updates is provided. An update executable and an update behavior profile corresponding to a software update are hashed using a cryptographic hash function. A hash of the update executable and the update behavior profile is signed using a private key to form a hashed update digital signature. According to other illustrative embodiments, a computer system and computer program product for verifying authenticity of software updates are provided.

DETAILED DESCRIPTION

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

Figure 1:
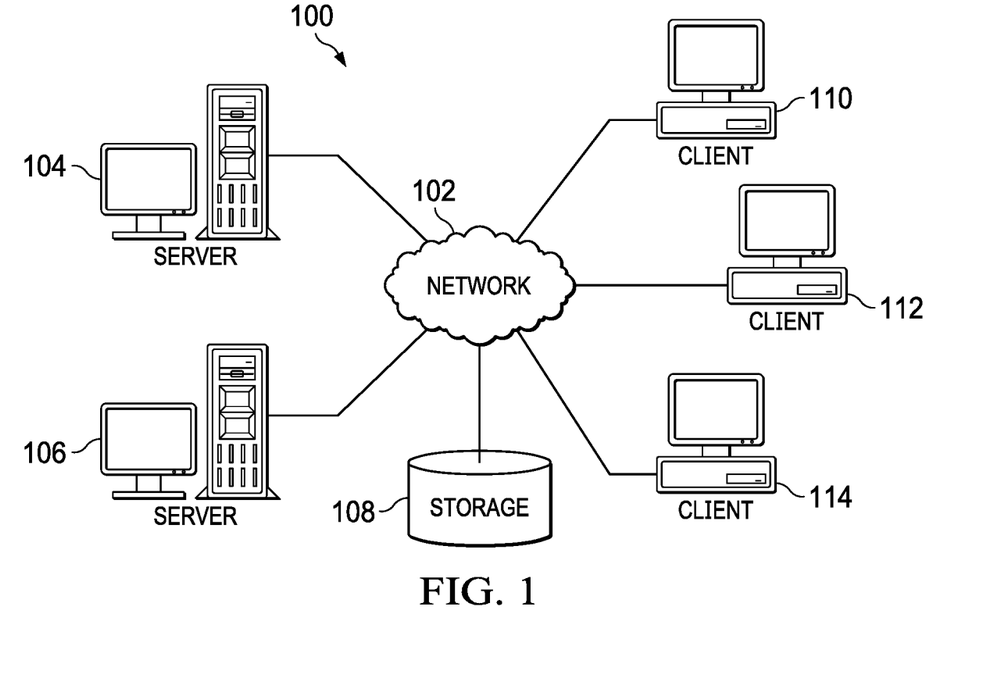
FIG. 1 is a pictorial representation of a network of data processing systems in which illustrative embodiments may be implemented.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. In addition, server 104 and server 106 may provide software update services to client devices. Also, it should be noted that server 104 and server 106 may represent clusters of servers in a data center. Alternatively, server 104 and server 106 may represent computing nodes in a cloud environment.

Client 110, client 112, and client 114 also connect to network 102. Clients 110, 112, and 114 are clients of server 104 and server 106. In this example, clients 110, 112, and 114 are shown as desktop or personal computers with wire communication links to network 102. However, it should be noted that clients 110, 112, and 114 are examples only and may represent other types of data processing systems, such as, for example, network computers, laptop computers, handheld computers, smart phones, smart watches, smart televisions, smart appliances, gaming devices, and the like. Users of clients 110, 112, and 114 may utilize clients 110, 112, and 114 to access and utilize the software update services provided by server 104 and server 106.

Storage 108 is a network storage device capable of storing any type of data in a structured format or an unstructured format. In addition, storage 108 may represent a plurality of network storage devices. Further, storage 108 may store identifiers and network addresses for a plurality of different software update servers, identifiers and network addresses for a plurality of different client devices, software updates, software update behavior profiles, and the like. Furthermore, storage unit 108 may store other types of data, such as authentication or credential data that may include user names, passwords, and biometric data associated with security analysts, system administrators, and client device users, for example.

In addition, it should be noted that network data processing system 100 may include any number of additional servers, clients, storage devices, and other devices not shown. Program code located in network data processing system 100 may be stored on a computer readable storage medium and downloaded to a computer or other data processing device for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), a telecommunications network, or any combination thereof. FIG. 1 is intended as an example only, and not as an architectural limitation for the different illustrative embodiments.

Figure 2:
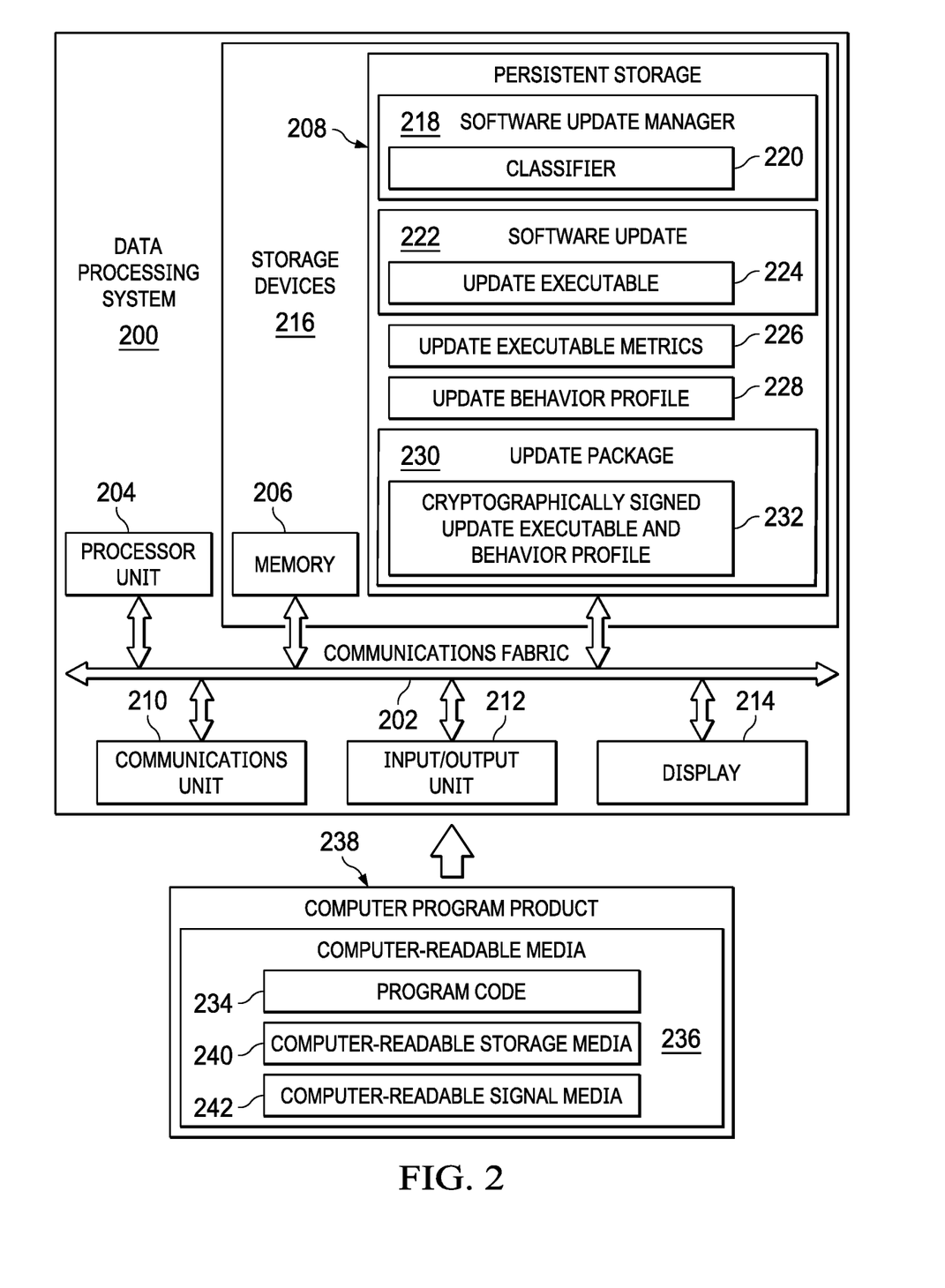
FIG. 2 is a diagram of a data processing system in which illustrative embodiments may be implemented.

With reference now to FIG. 2, a diagram of a data processing system is depicted in accordance with an illustrative embodiment. Data processing system 200 is an example of a computer, such as server 104 in FIG. 1, in which computer readable program code or instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-core processor, depending on the particular implementation.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random-access memory (RAM), or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores software update manager 218. However, it should be noted that even though software update manager 218 is illustrated as residing in persistent storage 208, in an alternative illustrative embodiment software update manager 218 may be a separate component of data processing system 200. For example, software update manager 218 may be a hardware component coupled to communication fabric 202 or a combination of hardware and software components. In another alternative illustrative embodiment, a first set of components of software update manager 218 may be located in data processing system 200 and a second set of components of software update manager 218 may be located in a second data processing system, such as, for example, client 110 in FIG. 1.

Software update manager 218 controls the process of cryptographically signing software update packages that include update executables and behavior profiles and verifying the integrity and authenticity of the software updates based on corresponding behavior profiles. In this example, software update manager 218 includes classifier 220. Classifier 220 is a trained software update behavior classifier that identifies correct behavior of software updates in a secure environment. Software update manager 218 trains classifier 220 using a set of historic behavior profiles corresponding to previously run software updates in the secure environment. Software update manager 218 utilizes classifier 220 to classify behavior of executing software updates via a digitally signed machine learning classifier or artificial neural network, for example.

Software update 222 may represent any type of update to any type of software, such as, for example, an operation system, program, application, or the like. In addition, it should be noted that software update 222 may also represent a software installation, bootstrapping process, and the like. Software update 222 may be for a computer or other type of data processing device, such as, for example, a smart phone or smart watch. Software update 222 includes update executable 224. Update executable 224 may represent script language or binary code, for example. Update executable 224 provides the instructions to implement software update 222 on the computer or other data processing device.

Software update manager 218 runs update executable 224 on a plurality of secure platforms over multiple iterations. While running update executable 224 on the plurality of secure platforms, software update manager 218 collects update executable metrics 226 using metric collection tools on each of the plurality of secure platforms. Update executable metrics 226 represent measurements corresponding to software update 222, such as, for example, what actions or tasks software update 222 performs during normal execution. Software update manager 218 utilizes classifier 220 to generate update behavior profile 228 based on collected update executable metrics 226 over the multiple runs. Update behavior profile 228 represents a stored profile corresponding to software update 222 that describes the normal behavior or characteristics of software update 222 while running. Thus, update behavior profile 228 is a behavior-based profile that provides a description of what the behavior of update executable 224 is (e.g., what files update executable 224 writes to, what system calls update executable 224 makes, and the like). In other words, software update manager 218 may use the information contained in update behavior profile 228 to detect whether software update 222 is performing normal activity or malicious activity while running on a client device based on comparing the information contained within update behavior profile 228 with metrics collected from the client device.

Software update manager 218 generates update package 230, which includes update executable 224 and update behavior profile 228 corresponding to software update 222. Software update manager 218 cryptographically hashes update executable 224 and update behavior profile 228 using, for example, a one-way hash function, such as Secure Hash Algorithm 2 or the like, and digitally signs the hash of update executable 224 and update behavior profile 228 using, for example, a private key corresponding to a provider or owner of software update 222. Digital signature is the process of using Public Key Infrastructure (PKI) to attest to the integrity and authenticity of update package 230 that includes cryptographically signed update executable and behavior profile 232. Software update manager 218 may deploy update package 230 automatically or upon receipt of a software update request from a client device, for example.

Communications unit 210, in this example, provides for communication with other computers, data processing systems, and devices via a network, such as network 102 in FIG. 1. Communications unit 210 may provide communications through the use of both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth® technology, global system for mobile communications (GSM), code division multiple access (CDMA), second-generation (2G), third-generation (3G), fourth-generation (4G), 4G Long Term Evolution (LTE), LTE Advanced, fifth-generation (5G), or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, a microphone, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented instructions, which may be located in a memory, such as memory 206. These program instructions are referred to as program code, computer usable program code, or computer readable program code that may be read and run by a processor in processor unit 204. The program instructions, in the different embodiments, may be embodied on different physical computer readable storage devices, such as memory 206 or persistent storage 208.

Program code 234 is located in a functional form on computer readable media 236 that is selectively removable and may be loaded onto or transferred to data processing system 200 for running by processor unit 204. Program code 234 and computer readable media 236 form computer program product 238. In one example, computer readable media 236 may be computer readable storage media 240 or computer readable signal media 242. Computer readable storage media 240 may include, for example, an optical or magnetic disc that is inserted or placed into a drive or other device that is part of persistent storage 208 for transfer onto a storage device, such as a hard drive, that is part of persistent storage 208. Computer readable storage media 240 also may take the form of a persistent storage, such as a hard drive, a thumb drive, or a flash memory that is connected to data processing system 200. In some instances, computer readable storage media 240 may not be removable from data processing system 200.

Alternatively, program code 234 may be transferred to data processing system 200 using computer readable signal media 242. Computer readable signal media 242 may be, for example, a propagated data signal containing program code 234. For example, computer readable signal media 242 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 234 may be downloaded over a network to persistent storage 208 from another device or data processing system through computer readable signal media 242 for use within data processing system 200. For instance, program code stored in a computer readable storage media in a data processing system may be downloaded over a network from the data processing system to data processing system 200. The data processing system providing program code 234 may be a server computer, a client computer, or some other device capable of storing and transmitting program code 234.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 240 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Software updates are an avenue of attack for many data processing systems. Current state of the art relies on cryptographically verifying the integrity of software updates, which ensures that only valid software updates by a software provider or vendor are executed. However, update executables, such as, for example, scripts or binaries, usually rely on external resources, which may not be included in integrity attestation of the update executable, such as, for example, package managers, downloaded additional resources, other existing software executables on the system, and the like. It is possible to breach the integrity of the update executable by attacking an external party. For example, installing an operating system update that relies on the integrity of a software package that is not maintained by the original software provider or vendor.

Software updates are very common and may apply to different parts of the software stack from operating system drivers to user-space applications. However, there are many problems related to the delivery and execution of these software updates (i.e., lack of integrity and authenticity of these software updates). There have been many instances of malicious activity occurring on data processing systems due to unverified software updates being executed or exploitation of software update services.

To guard against this malicious activity, many software providers sign their updates through cryptographically hashing the executable that defines the software update and generating a digital signature using the private key of the software provider. The update executable is then verified at update time to ensure integrity and authenticity. If the update executable is a standalone script or binary, then the behavior of the software update should be as expected. However, software providers are making use of many different software package managers and dynamic operations for obtaining software packages and executables from repositories on the Internet. As a result, even if a software provider digitally signs an update executable, no guarantee exists that the information obtained from the execution of the update executable is verified. As an example, a software provider digitally signs a software update. One of the steps of the update includes install repository "abc.xyz". If the repository "abc.xyz" is compromised, the software update process could be installing some outdated or malicious code.

Illustrative embodiments generate digital signatures of software updates not just by hashing the update executable, but also generating a digital signature of the update executable's behavior profile, which describes what the update executable does in the data processing system during execution. It should be noted that illustrative embodiments are not restricted to software updates only, but may also be utilized for software installations, bootstrapping processes, and the like.

For a host data processing system to perform a software update using illustrative embodiments, the host system verifies the digital signature of both the update executable and the update behavior profile and then runs the software update. If execution of the software update leads to anomalous behavior that does not match the information in the update behavior profile (e.g., the update behavior profile indicates that the software update writes file "a.txt" with hash "ab3d . . . ", but the update executable writes the same file with a different hash "48fd . . . ".), then the host terminates the software update and takes appropriate mitigation action steps, such as, for example, send a security incident alert to a security analyst, perform a rollback operation to return the host to a former state, block the provider that sent the software update from sending further software updates until further investigation can be performed by the security analyst, and the like.

Current signing procedures do not protect against such cases. Current signing procedures assume that the update code is secure in terms of verifying every operation that the update code performs. However, this may not be true, especially if software providers are able to influence these update executables directly or a lapse in the review of update executables is made.

Illustrative embodiments utilize a private key for cryptographically signing an update executable and update behavior profile and utilize a public key for cryptographically verifying the integrity and authenticity of the update executable and update behavior profile. To generate an update behavior profile and its signature, illustrative embodiments simulate the software update by running the software update on multiple secure environments over multiple iterations. Illustrative embodiments collect a list of metrics or measurements, such as, for example, files that are written, files that are read, network connections established, system calls made, and the like, corresponding to each run of the software update. Illustrative embodiments generate the behavior profile of the software update based on the collected list of metrics to determine what the normal behavior of the software update is. Illustrative embodiments cryptographically hash and sign the update behavior profile.

Upon software update installation, the host data processing system utilizing illustrative embodiments first downloads the software update package, which includes the cryptographically signed update executable and update behavior profile. Next, the host system runs the software update and collects metrics corresponding to the running software update. Illustrative embodiments provide the collected metrics to a trained software update behavior classifier of the host system to determine whether the software update is behaving correctly based on the information in the behavior profile. If the trained software update behavior classifier detects that the software update is behaving anomalously (e.g., file written does not meet the correct hash), then the trained software update behavior classifier flags the software update as a security incident. At that point, the trained software update behavior classifier may perform a remediation step, such as, for example, automatically perform a rollback operation.

It should be noted that illustrative embodiments assume while classifying software updates that a set of one or more operations within a particular software update does not verify integrity of external resources used. This is one reason for why current software updates fail in terms of installation. An example of this is running a command that does not perform verification based on some PKI process. An example use case may be that an update behavior profile contains hashes of files written to a file system. It should be noted that an update that installs a certain package writes to certain files. For example, a library update may write to a user library. Therefore, illustrative embodiments generate a behavioral profile for the update based on this information. When the update is being run, illustrative embodiments may detect that the update is modifying a configuration file and not the user library, which is a violation and security incident. Thus, illustrative embodiments detected a violation in the running of the update based on the information in the behavior profile. Another use case may be that an update behavior profile describes creation of a set of one or more new user identities on a host data processing system. For example, an update to a web server may create one new user identity "nginx" with no privileges. However, illustrative embodiments detect that when the update is being executed, the update creates two new user identities instead of one, "nginx" with no privileges and "nginx-root" with root privileges, which is a violation and security incident based on the information in the behavior profile. This software update may be from an attacker who has figured out how to influence the update process. Illustrative embodiments detect this violation in the running of the update. Further, verification of the behavior of the update includes illustrative embodiments verifying the created set of new user identities and their corresponding privileges. For example, if creating a new user identity and corresponding privileges is in the software update, itself, then illustrative embodiments determine that no violation exists. However, if creating the new user identity and corresponding privileges is based on a call to an external package manager resource without verifying integrity of the package manager, then illustrative embodiments detect a lapse in verification and prevent creation of the new user identity.

Thus, illustrative embodiments provide a non-invasive, low cost way to protect update executables against external third-party trust compromise using update behavior-based profiles. Therefore, illustrative embodiments provide one or more technical solutions that overcome a technical problem with verifying software update integrity and authenticity. As a result, these one or more technical solutions provide a technical effect in the field of software updates and data processing system performance.

Figure 3:
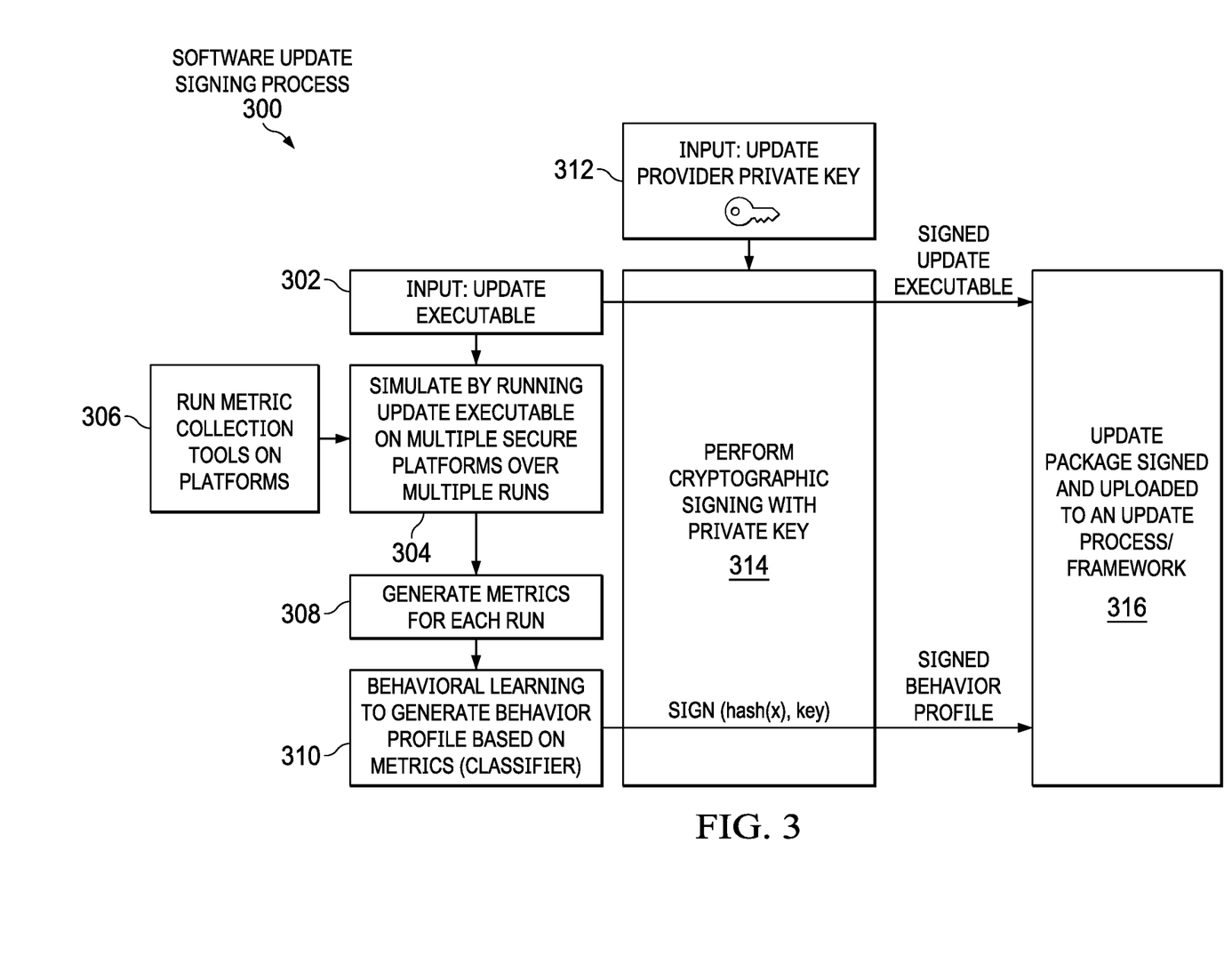
FIG. 3 is a diagram illustrating an example of a software update signing process in accordance with an illustrative embodiment.

With reference now to FIG. 3, a diagram illustrating an example of a software update signing process is depicted in accordance with an illustrative embodiment. Software update signing process 300 may be implemented in a computer, such as server 104 in FIG. 1 or data processing system 200 in FIG. 2.

At 302, the computer receives an update executable as input. The update executable may be, for example, update executable 224 of software update 222 in FIG. 2. At 304, the computer simulates the software update by running the update executable on multiple secure platforms over multiple runs. At 306, the computer runs metric collection tools on the multiple secure platforms to collect metrics corresponding to the running update executable.

At 308, the computer generates metrics for each run of the update executable on the multiple secure platforms. The metrics may be, for example, update executable metrics 226 in FIG. 2. At 310, the computer utilizes a software update classifier, such as classifier 220 in FIG. 2, to learn behavior of the running update executable and generate a behavior profile corresponding to the update executable based on the metrics. The behavior profile may be, for example, update behavior profile 228 in FIG. 2.

At 312, the computer retrieves a private key corresponding to the provider of the software update. At 314, the computer performs cryptographic signing of the update executable and the behavior profile using the private key to form a cryptographically signed update executable and behavior profile. At 316, the computer generates an update package, such as update package 230 in FIG. 2, which includes the cryptographically signed update executable and behavior profile, uploads the update package to an update process or framework for distribution to client data processing devices.

Figure 4:
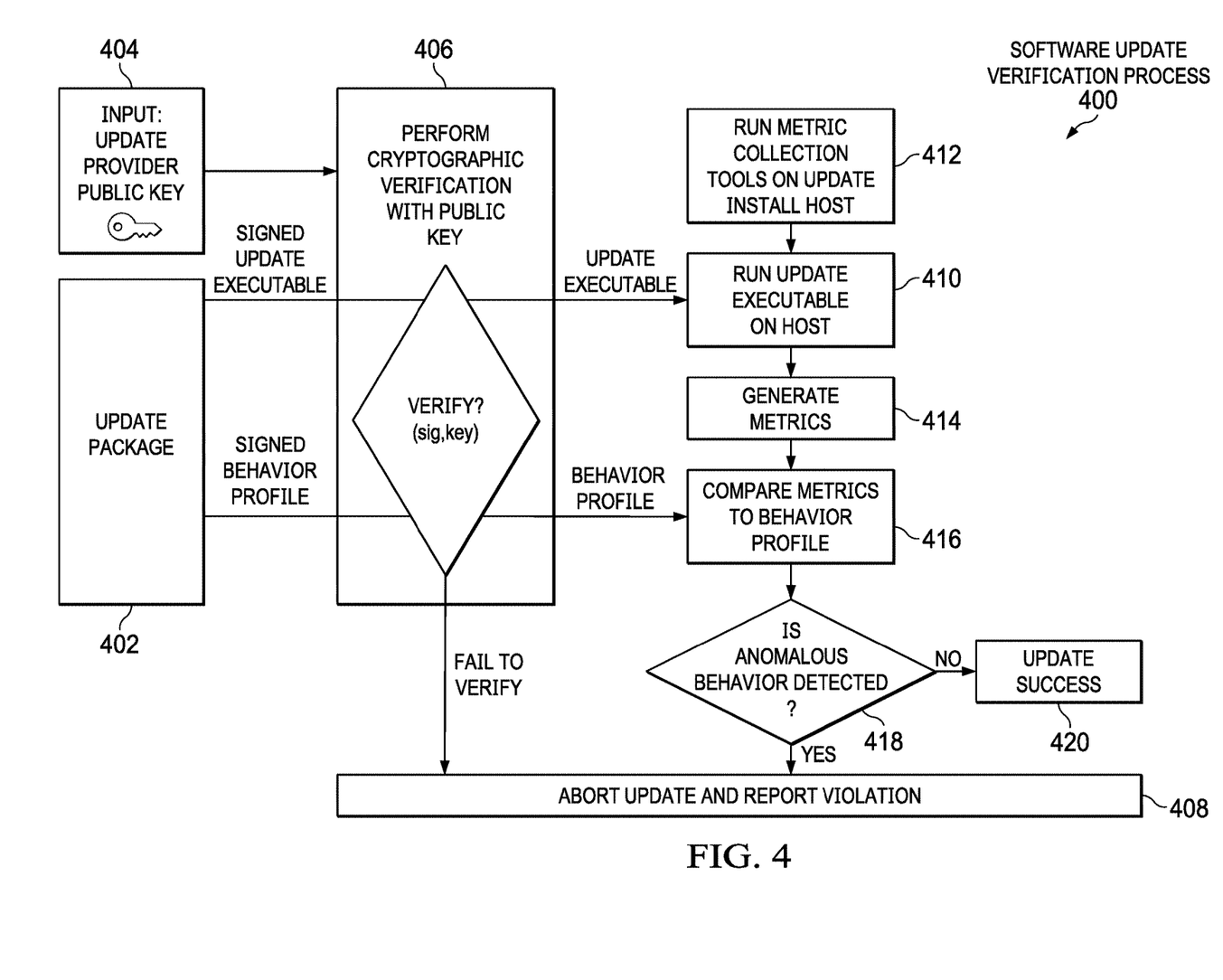
FIG. 4 is a diagram illustrating an example of a software update verification process in accordance with an illustrative embodiment.

With reference now to FIG. 4, a diagram illustrating an example of a software update verification process is depicted in accordance with an illustrative embodiment. Software update verification process 400 may be implemented in a data processing system, such as client 110 in FIG. 1.

At 402, the data processing system receives an update package for installation, such as update package 230 in FIG. 2, which includes a cryptographically signed update executable and cryptographically signed behavior profile. At 404, the data processing system retrieves a public key corresponding to a provider of the update package. At 406, the data processing system performs cryptographic verification of the cryptographically signed update executable and cryptographically signed behavior profile using the public key.

If the data processing system fails to verify the integrity and authenticity of the cryptographically signed update executable and cryptographically signed behavior profile using the public key at 406, then the data processing system aborts the software update process and reports a violation (e.g., security incident) at 408. If the data processing system verifies the integrity and authenticity of the cryptographically signed update executable and cryptographically signed behavior profile using the public key at 406, then the data processing system runs the update executable at 410. In addition, the data processing system runs metric collection tools to collect metrics of the running update executable at 412. At 414, the data processing system generates the metrics corresponding to the running update executable.

At 416, the data processing system compares the metrics to the information in the behavior profile. At 418, the data processing system makes a determination as to whether anomalous behavior of the update executable is detected based on the comparison between the metrics and the information in the behavior profile. If the data processing system determines that anomalous behavior of the update executable is detected at 418, then the data processing system aborts the software update and reports the violation to a security analyst, for example. If the data processing system determines that anomalous behavior of the update executable is not detected at 418, then the data processing system completes the software update and reports update success at 420.

Figure 5:
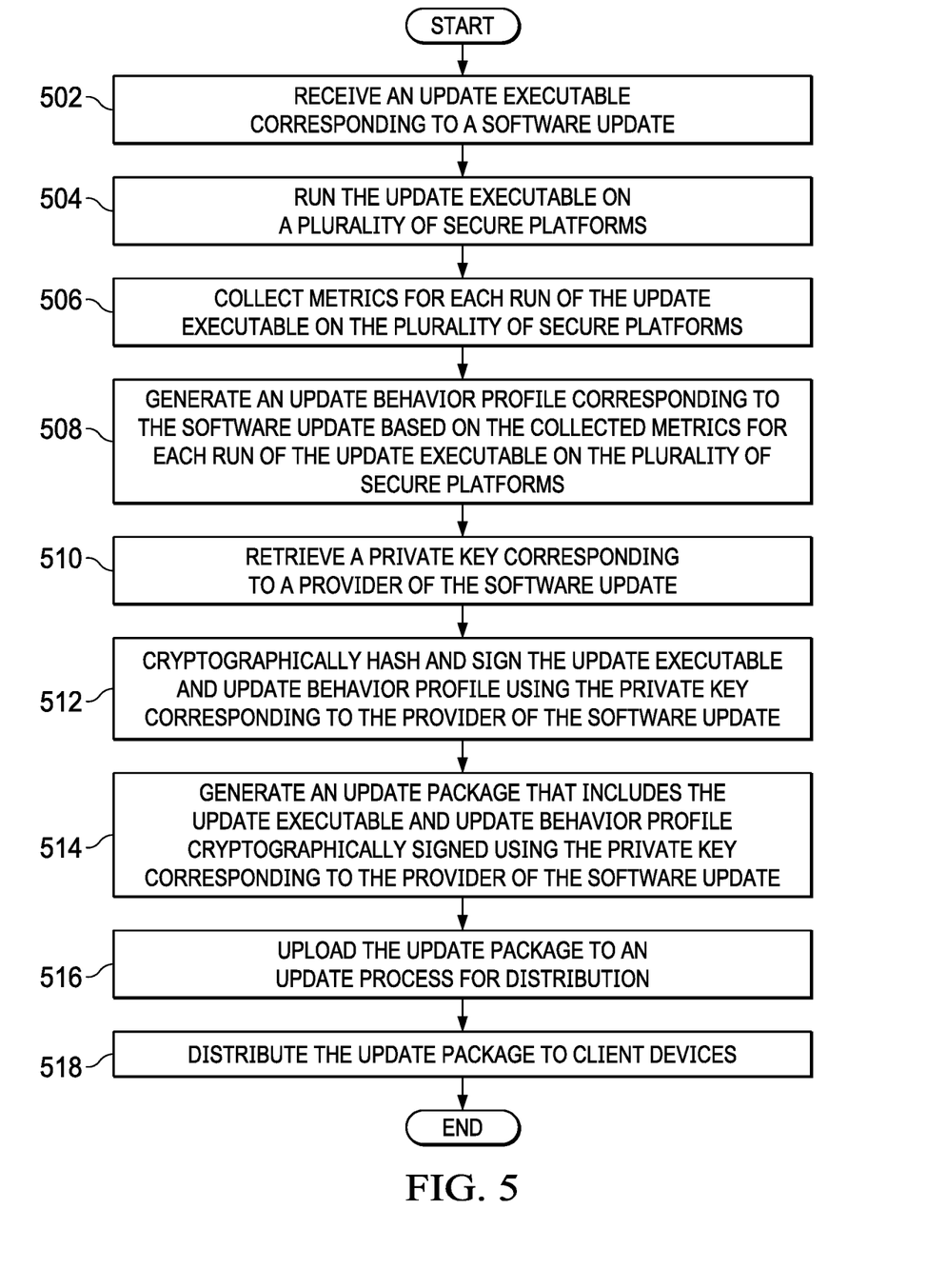
FIG. 5 is a flowchart illustrating a process for digitally signing a software update package in accordance with an illustrative embodiment.

With reference now to FIG. 5, a flowchart illustrating a process for digitally signing a software update package is shown in accordance with an illustrative embodiment. The process shown in FIG. 5 may be implemented in a computer, such as, for example, server 104 in FIG. 1 or data processing system 200 in FIG. 2.

The process begins when the computer receives an update executable corresponding to a software update (step 502). The computer runs the update executable on a plurality of secure platforms (step 504). A secure platform is a computer system that includes security architecture, tools, and processes for ensuring security of the entire computing platform's hardware, software, network, storage, and other components.

The computer collects metrics for each run of the update executable on the plurality of secure platforms (step 506). In addition, the computer generates an update behavior profile corresponding to the software update based on the collected metrics for each run of the update executable on the plurality of secure platforms (step 508).

The computer retrieves a private key corresponding to a provider of the software update (step 510). The computer cryptographically hashes and signs the update executable and update behavior profile using the private key corresponding to the provider of the software update (step 512). The computer generates an update package that includes the update executable and update behavior profile cryptographically signed using the private key corresponding to the provider of the software update (step 514).

The computer uploads the update package to an update process for distribution (step 516). The computer distributes the update package to client devices (step 518). Thereafter, the process terminates.

Figure 6:
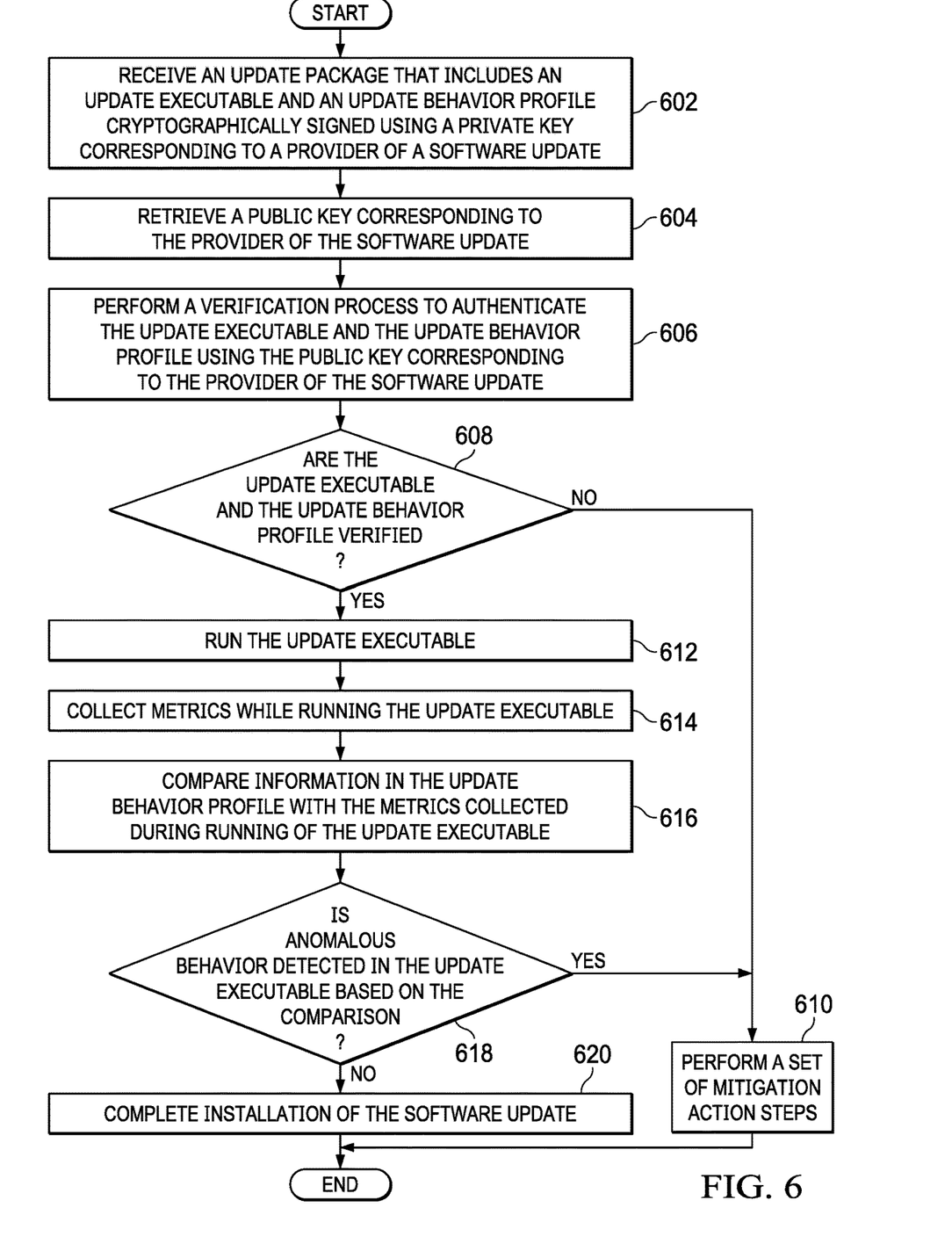
FIG. 6 is a flowchart illustrating a process for cryptographically verifying a software update package in accordance with an illustrative embodiment.

With reference now to FIG. 6, a flowchart illustrating a process for cryptographically verifying a software update package is shown in accordance with an illustrative embodiment. The process shown in FIG. 6 may be implemented in a data processing system, such as, for example, client 110 in FIG. 1.

The process begins when the data processing system receives an update package that includes an update executable and an update behavior profile cryptographically signed using a private key corresponding to a provider of a software update (step 602). The data processing system retrieves a public key corresponding to the provider of the software update (step 604). The data processing system performs a verification process to authenticate the update executable and the update behavior profile using the public key corresponding to the provider of the software update (step 606).

The data processing system makes a determination as to whether the update executable and the update behavior profile are verified based on the verification process (step 608). If the data processing system determines that the update executable and the update behavior profile are not verified based on the verification process, no output of step 608, then the data processing system performs a set of mitigation action steps (step 610) and the process terminates thereafter. If the data processing system determines that the update executable and the update behavior profile are verified based on the verification process, yes output of step 608, then the data processing system runs the update executable (step 612). Further, the data processing system collects metrics while running the update executable (step 614).

The data processing system compares information in the update behavior profile with the metrics collected during running of the update executable (step 616). The data processing system makes a determination as to whether anomalous behavior is detected in the update executable based on the comparison (step 618). If the data processing system determines that anomalous behavior is not detected in the update executable based on the comparison, no output of step 616, then the data processing system completes installation of the software update (step 620) and the process terminates thereafter. If the data processing system determines that anomalous behavior is detected in the update executable based on the comparison, yes output of step 616, then the process returns to step 620 where the data processing system performs a set of one or more mitigation action steps, such as raise a security incident alert, stop running the update executable, perform a rollback operation, block the provider sending the software update, and the like.

Figure 7:
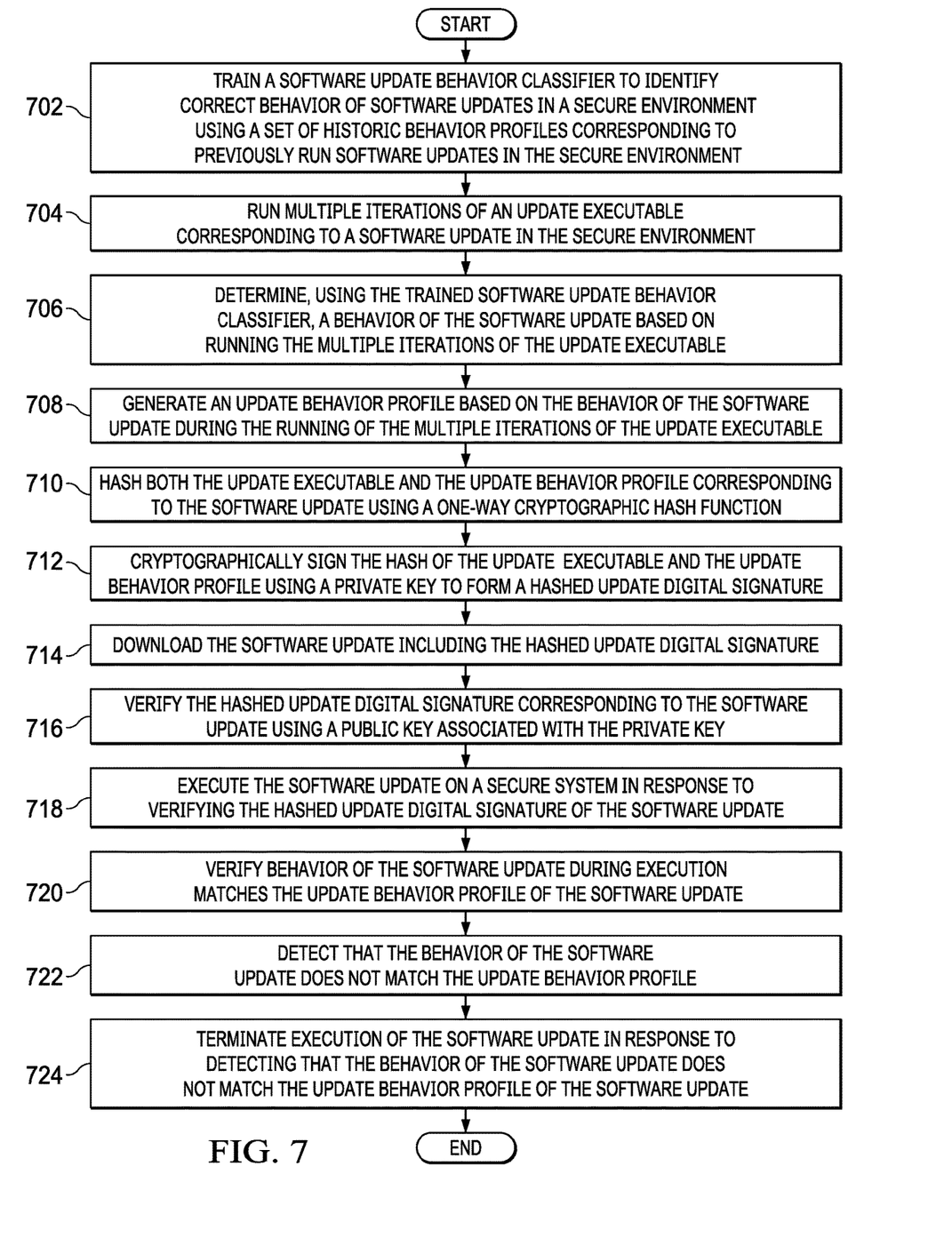
FIG. 7 is a flowchart illustrating a process for detecting anomalous behavior in a software update based on an update behavior profile in accordance with an illustrative embodiment.

With reference now to FIG. 7, a flowchart illustrating a process for detecting anomalous behavior in a software update based on an update behavior profile is shown in accordance with an illustrative embodiment. The process shown in FIG. 7 may be implemented in a computer, such as, for example, server 104 in FIG. 1 or data processing system 200 in FIG. 2.

The process begins when the computer trains a software update behavior classifier to identify correct behavior of software updates in a secure environment using a set of historical behavior profiles corresponding to previously run software updates in the secure environment (step 702). However, it should be noted that the component that creates a behavioral profile does not necessarily have to be trained, the component can also be code written by a human. Afterward, the computer runs multiple iterations of an update executable corresponding to a software update in the secure environment (step 704). The secure environment may include a plurality of secure computing platforms. The computer, using the trained software update behavior classifier, determines a behavior of the software update based on running the multiple iterations of the update executable (step 706). The computer generates an update behavior profile based on the behavior of the software update during the running of the multiple iterations of the update executable (step 708).

The computer hashes both the update executable and the update behavior profile corresponding to the software update using a one-way cryptographic hash function (step 710). In addition, the computer cryptographically signs the hash of the update executable and the update behavior profile using a private key to form a hashed update digital signature (step 712). The computer downloads the software update including the hashed update digital signature (step 714).

The computer verifies the hashed update digital signature corresponding to the software update using a public key associated with the private key (step 716). The computer executes the software update on a secure system in response to verifying the hashed update digital signature of the software update (step 718). The computer verifies behavior of the software update during execution matches the update behavior profile of the software update (step 720).

The computer detects that the behavior of the software update does not match the update behavior profile (step 722). The computer terminates execution of the software update in response to detecting that the behavior of the software update does not match the update behavior profile of the software update (step 724). Thereafter, the process terminates.

Thus, illustrative embodiments of the present invention provide a computer-implemented method, computer system, and computer program product for verifying authenticity of software updates based on behavior-based profiles corresponding to the software updates. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for verifying authenticity of software updates, the method comprising:
   receiving an update executable corresponding to a software update of a software program installed on a computer system;
   simulating the software update of the software program installed on a computer system by running multiple iterations of the update executable corresponding to the software update on a plurality of secure platforms;
   determining a behavior of the software update based on running the multiple iterations of the update executable on the plurality of secure platforms;
   generating an update behavior profile corresponding to the software update based on the behavior of the software update during the running of the multiple iterations of the update executable on the plurality of secure platforms;
   retrieving a private key corresponding to a provider of the update executable;
   hashing the update executable and the update behavior profile corresponding to the software update using a cryptographic hash function;
   signing a hash of the update executable and the update behavior profile using the private key to form a hashed update digital signature;
   downloading the software update including the hashed update digital signature formed by signing the hash of the update executable and the update behavior profile using the private key;

verifying the hash of both the update executable and the update behavior profile using a public key associated with the private key;

executing the update executable in response to verifying the hash of the update executable and the update behavior profile using the public key associated with the private key; and verifying a behavior of the update executable during execution matches the update behavior profile corresponding to the software update of the software program installed on the computer system.

2. The method of claim 1 further comprising:

running the update executable corresponding to the software update and collecting metrics corresponding to the running update executable;

providing the collected metrics to a trained software update behavior classifier;

detecting, by the trained software update behavior classifier, that a behavior of the downloaded software update does not match the update behavior profile; and terminating running of the update executable corresponding to the software update in response to detecting that the behavior of the software update does not match the update behavior profile corresponding to the software update of the software program installed on the computer system.

3. The method of claim 1, wherein the update behavior profile describes what functions are performed by the update executable corresponding to the software update of the software program installed on the computer system, including files that are written and read by the update executable corresponding to the software update of the software program installed on the computer system.

4. The method of claim 1, wherein verifying the behavior of the software update comprises executing a metric collection tool to collect metrics of the executing update executable corresponding to the software update of a software program installed on the computer system further comprising.

5. The method of claim 1 further comprising:

collecting metrics for each run of the update executable on a plurality of secure platforms; and generating the update behavior profile corresponding to the software update based on collected metrics for each run of the update executable on the plurality of secure platforms.

6. The method of claim 5, wherein the collected metrics is selected from a group consisting of files that are written, files that are read, network connections established, and system calls made.

7. The method of claim 1 further comprising:

generating an update package that includes the update executable corresponding to the software update of the software program installed on the computer system and the update behavior profile cryptographically signed using the private key corresponding to a provider of the software update;

uploading the update package to an update process for distribution; and distributing the update package.

8. The method of claim 1 further comprising:

comparing information in the update behavior profile with metrics collected during running of the update executable;

determining whether anomalous behavior is detected in the update executable based on the comparing; and responsive to determining that anomalous behavior is detected in the update executable based on the comparing, performing a set of mitigation action steps.

9. The method of claim 8, wherein the set of mitigation action steps is selected from a group consisting of raise a security incident alert, stop running the update executable, perform a rollback operation, and block a provider sending the software update.

10. The method of claim 1, wherein a classifier classifies the behavior of the software update of the software program installed on the computer system, and wherein the classifier is selected from a group consisting of a digitally signed machine learning classifier and an artificial neural network.

11. The method of claim 1, wherein the software update of the software program installed on the computer system does not verify integrity of external resources called by the update executable corresponding to the software update of the software program installed on the computer system.

12. The method of claim 1, wherein the update behavior profile corresponding to the software update describes a set of new user identities with certain privileges on a host data processing system, and wherein verifying the behavior of the software update of the software program installed on the computer system includes verifying the created set of new user identities and corresponding privileges described by the update behavior profile using the update behavior profile corresponding to the software update.

13. A computer system for verifying authenticity of software updates, the computer system comprising:

a bus system;

a storage device connected to the bus system, wherein the storage device stores program instructions; and a set of processors connected to the bus system, wherein a first processor in the set of processors executes the program instructions to:

receive an update executable software corresponding to a software update of a software program installed on the computer system;

simulate the software update of the software program installed on a computer system by running multiple iterations of the update executable software corresponding to the software update on a plurality of secure platforms;

determine a behavior of the software update based on running the multiple iterations of the update executable software on the plurality of secure platforms;

generate an update behavior profile corresponding to the software update based on the behavior of the software update during the running of the multiple iterations of the update executable software on the plurality of secure platforms;

retrieve a private key corresponding to a provider of the update executable software;

hash the update executable software and the update behavior profile corresponding to the software update using a cryptographic hash function;

sign a hash of the update executable software and the update behavior profile using the private key corresponding to the provider of the update executable software to form a hashed update digital signature;

download the software update including the hashed update digital signature formed by signing the hash of the update executable and the update behavior profile using the private key;

verify the hash of both the update executable and the update behavior profile using a public key associated with the private key;

execute the update executable in response to verifying the hash of the update executable and the update behavior profile using the public key associated with the private key; and verify a behavior of the update executable during execution matches the update behavior profile corresponding to the software update of the software program installed on the computer system.

14. The computer system of claim 13, wherein a second processor in the set of processors further executes the program instructions to:

run the update executable corresponding to the software update and collect metrics corresponding to the running update executable;

provide the collected metrics to a trained software update behavior classifier;

detect that a behavior of the downloaded software update does not match the update behavior profile; and terminate running of the update executable corresponding to the software update in response to detecting that the behavior of the software update does not match the update behavior profile corresponding to the software update of the software program installed on the computer system.

15. The computer system of claim 13, wherein the update behavior profile describes what functions are performed by the update executable software corresponding to the software update of the software program installed on the computer system, including files that are written and read by the update executable corresponding to the software update of the software program installed on the computer system.

16. A computer program product for verifying authenticity of software updates, the computer program product comprising a computer readable storage medium having program instructions embodied therewith, the program instructions executable by a set of processors to cause the set of processors to perform a method comprising:

receiving an update executable software corresponding to a software update of a software program installed on a computer system;

simulating the software update of the software program installed on a computer system by running multiple iterations of the update executable software corresponding to the software update on a plurality of secure platforms;

determining a behavior of the software update based on running the multiple iterations of the update executable software on the plurality of secure platforms;

generating an update behavior profile corresponding to the software update based on the behavior of the software update during the running of the multiple iterations of the update executable software on the plurality of secure platforms;

retrieving a private key corresponding to a provider of the update executable software;

hashing the update executable software and the update behavior profile corresponding to the software update using a cryptographic hash function;

signing a hash of the update executable software and the update behavior profile using the private key corresponding to the provider of the update executable software to form a hashed update digital signature;

downloading the software update including the hashed update digital signature formed by signing the hash of the update executable and the update behavior profile using the private key;

verifying the hash of both the update executable and the update behavior profile using a public key associated with the private key;

executing the update executable in response to verifying the hash of the update executable and the update behavior profile using the public key associated with the private key; and verifying a behavior of the update executable during execution matches the update behavior profile corresponding to the software update of the software program installed on the computer system.

17. The computer program product of claim 16 further comprising:

running the update executable corresponding to the software update and collecting metrics corresponding to the running software update;

providing the collected metrics to a trained software update behavior classifier;

detecting, by the trained software update behavior classifier, that a behavior of the downloaded software update does not match the update behavior profile; and terminating running of the update executable corresponding to the software update in response to detecting that the behavior of the software update does not match the update behavior profile corresponding to the software update of the software program installed on the computer system.

18. The computer program product of claim 16, wherein the update behavior profile describes what functions are performed by the update executable software corresponding to the software update of the software program installed on the computer system, including files that are written and read by the update executable corresponding to the software update of the software program installed on the computer system.

19. The computer program product of claim 16, wherein verifying the behavior of the software update comprises executing a metric collection tool to collect metrics of the executing update executable corresponding to the software update of a software program installed on the computer system.

20. The computer program product of claim 16 further comprising:

collecting metrics for each run of the update executable software on a plurality of secure platforms; and generating the update behavior profile corresponding to the software update based on collected metrics for each run of the update executable software on the plurality of secure platforms.

* * * * *